United States Patent [19]

Bailey

[11] Patent Number: 5,565,230

[45] Date of Patent: Oct. 15, 1996

[54] CHERRY PRESERVATION PACKAGING METHOD

[75] Inventor: Donald W. Bailey, The Dalles, Oreg.

[73] Assignee: Orchard View Farms, Inc., The Dalles, Oreg.

[21] Appl. No.: 311,704

[22] Filed: Sep. 23, 1994

Related U.S. Application Data

[63] Continuation of Ser. No. 1,848, Jan. 8, 1993, abandoned.

[51] Int. Cl.$^6$ .......................... A23B 7/148; B65B 55/00
[52] U.S. Cl. .................. 426/411; 426/316; 426/415; 426/419
[58] Field of Search .................... 426/415, 419, 426/118, 395, 316, 263; 383/100, 102, 103

[56] References Cited

U.S. PATENT DOCUMENTS

| | | | |
|---|---|---|---|
| 1,821,106 | 9/1931 | Milani . | |
| 2,452,174 | 10/1948 | Arnold | 99/171 |
| 3,450,542 | 6/1969 | Badran | 99/154 |
| 3,450,544 | 6/1969 | Badran et al. | 426/419 |
| 3,507,667 | 4/1970 | Magnen | 99/171 |
| 3,521,806 | 7/1970 | Esty | 229/14 |
| 3,630,759 | 12/1971 | Rumberger | 99/171 LP |
| 3,706,410 | 12/1972 | Baker | 229/16 R |
| 3,761,289 | 9/1973 | Wolf | 99/171 CA |
| 3,939,624 | 2/1976 | Gidewall et al. | 53/112 B |
| 3,968,629 | 7/1976 | Gidewall et al. | 53/373 |
| 4,055,931 | 11/1977 | Myers | 53/22 B |
| 4,224,347 | 9/1980 | Woodruff | 426/106 |
| 4,241,558 | 12/1980 | Gidewall et al. | 53/79 |
| 4,411,918 | 10/1983 | Cimino et al. | 426/124 |
| 4,515,266 | 5/1985 | Myers | 206/205 |
| 4,548,824 | 10/1985 | Mitchell et al. | 426/111 |
| 4,548,852 | 10/1985 | Mitchell | 426/111 |
| 4,842,875 | 6/1989 | Anderson | 426/419 |
| 4,883,674 | 11/1989 | Fan | 426/118 |
| 4,923,703 | 5/1990 | Antoon, Jr. | 426/118 |
| 4,943,440 | 7/1990 | Armstrong | 426/118 |

OTHER PUBLICATIONS

"Controlled Atmosphere Packaging of Produce", pp. 23–29, Varriano–Marston et al, *Produce Marketing Almanac*, 1987.

"Controlling Atmosphere In a Fresh Fruit Package" by P. Veeraju and M. Karel, pp. 169–, *Modern Packaging*, Vol. 40, No. 2, 1966.

"C. A. Storage of Rainier Cherries" by Max Patterson and Kurt Guelich, pp. 228–230, *Proceedings of Washington Horticultural Association*, 1989.

"Cherry Quality–a 1991 Postharvest Update" by Eugene Kupferman, pp. 222–225, *Proceedings of Washington Horticultural Association*, 1990.

(List continued on next page.)

*Primary Examiner*—Michael W. Ball
*Assistant Examiner*—Richard Crispino
*Attorney, Agent, or Firm*—Klarquist, Sparkman, Campbell, Leigh & Whinston, LLP

[57] ABSTRACT

A packaging method and package for preserving cherries using a low barrier plastic film to provide them with a long shelf life is described. The low barrier plastic film has a gas permeability of at least 80 cc $O_2$ and 490 cc $CO_2$ per mil per 100 square inches per day at 25° C. and 760 mm HI. Both high density polyethylene and low density polyethylene films having a thickness in the range of 0.0006 to 0.003 inch are used in examples for packaging bags. However other low barrier film plastics can be used including polypropylene The bags are provided with one or more small perforations to adjust their gas permeability. After cooling the cherries to about 36° F. they are deposited in the bags. The bags are partially evacuated to remove about one half the air and an injection gas of at least 30% $CO_2$ and the balance $N_2$ is injected to fill the bag which is then heat sealed. As a result, a residual protective gas of about 4–13% $O_2$, 4–14% $CO_2$ and balance $N_2$ is maintained in the bag after seven days from sealing. The packages of cherries may be stored at about 28° F. for two months or more without significant decay or mold and without adversely affecting the appearance or taste of the cherries.

20 Claims, 2 Drawing Sheets

OTHER PUBLICATIONS

"Respiration of Sweet Cherries Determined In Sealed Impermeable Containers" by T. Beveridge and N. B. Day, pp. 213–217, *Journal Canadian Institute on Food Science and Technology*, vol. 24, No. 5, 1991.

"Respiration, Internal Atmosphere, and Moisture Studies of Sweet Cherries During Storage" by F. Gerhardt, H. English and E. Smith, pp. 119–123, *Proceedings American Society for Horticultural Science*, No. 41, 1942.

"Effects of Controlled Atmosphere (CA) Storage on Amino Acids, Organic Acids, Sugars, and Rate of Respiration of Lambert Sweet Cherry Fruit", by B. Singh, N. A. Littlefield, and D. K. Salunkhe, pp. 458–461, *Proceedings American Society for Horticultural Science*, vol. 95, No. 4, 1970.

Section 4–Plastics, Films, Foil Laminations, *Modern Packaging Encyclopedia*, pp. 130–133, 144–145, 1971 Issue.

"Modified Atmosphere Packaging of Sweet Cherries" by S. R. Drake and E. M. Kupferman, p. 210, *Proceedings of Washington State Horticultural Association*, 1990.

"Choosing Right Film 'No Crap Shoot'" by D. Zagory, pp. 24–25, *Packer/Shipper Magazine*, May 1992.

"Controlled Atmosphere Packaging Extends Avocado's Shelf Life", p. 18, *Produce Business Magazine*, Dec. 1991.

"New Data On Cherries" by F. Gerhardt and G. Lindell, pp. 116–119, 166 and 168, *Modern Packaging*, Mar. 1951.

"The Storage of Sweet Cherries as Influenced by Carbon Dioxide and Volatile Fungicides" by F. Gerhardt and A. L. Ryall, pp. 1–20, *USDA Technical Bulletin*, No. 631, Feb. 1939.

FIG. 2 ial temperature and 760 mm Hg pressure, and for low barrier, high density polyethylene preferably has a permeability of about 400 cc $O_2$ and 1164 cc of $CO_2$ per mil thickness per 100 square inches per day at 25° C. and 760 mm Hg.

CHERRY PRESERVATION PACKAGING METHOD

This application is a continuation, of application Ser. No. 08/001,848, filed on Jan. 8, 1993, now abandoned.

The present invention relates generally to the preservation of tree grown fruit such as cherries after they have been picked and packaged for distribution to consumers. More specifically, the invention relates to a packaging method and package for preserving cherries in a container formed of a low barrier plastic film having a high permeability to gas and is more permeable to carbon dioxide than oxygen. The cherry container contains a preservative gas mixture including oxygen ($O_2$) at a percentage less than that in air, preferably in the range of about 4–14% $O_2$, and carbon dioxide ($CO_2$) at a percentage greater than that in air, preferably in the range of about 4–13% $CO_2$. The packaging method of the present invention includes evacuating the container to remove at least some of the air from such container before refilling the container with an insertion gas mixture of nitrogen ($N_2$) and carbon dioxide which is in the range of about 30–50% $CO_2$, and the balance nitrogen when one half the air is removed, and subsequently heat sealing the plastic container. In addition, the container of low barrier plastic film may be provided with one or more small perforations to increase the permeability of the container to gas.

BACKGROUND OF THE INVENTION

It has previously been proposed in U.S. Pat. No. 4,515,266 to Myers issued May 7, 1985 to provide a package for preserving produce including a container formed of a high barrier plastic film which is provided with a preservative gas and perforated to provide a gas pressure within the container sufficient to inhibit air flow into the container and to allow gas outflow from the container. In the Myers '266 patent the high barrier plastic film is defined as having a low gas permeability to $O_2$ of less than 1.0 cc and $CO_2$ of less than 5.0 cc per mil (0.001 inch) thickness per 100 square inches per 24 hours at standard atmospheric temperature and pressure of 0° C. and 760 mm Hg. Such high barrier plastic film has been found to be unsuitable for packaging cherries commercially in 20 pound packages to preserve them for extended shelf life.

U.S. Patent No. 4,883,674 to Fan issued Nov. 28, 1989 shows a packaging method and package for cut fruit and fruit salad which includes a sealed imperforate container with a high barrier plastic film portion which has an equilibrium protective gas atmosphere within the container of about 2–5% oxygen, 10–15% carbon dioxide and the balance nitrogen. However, this package is not suitable for packaging cherries for preservation to provide an extended shelf life because it produces anaerobic conditions for the cherries causing them to rapidly decay because the protective gas has less than 4% $O_2$ due to the use of a high barrier film with low gas permeability. The packaging method and package of the present invention overcomes these problems by employing a low barrier plastic film having a high gas permeability and by providing additional perforations in the plastic film to provide the proper gas permeability to avoid anaerobic conditions for cherries. Thus the package of Fan has a permeability of about 4 to 12 cc of oxygen per day per ounce of produce. The low barrier plastic film employed in the package of the present invention has a gas permeability of at least 80 cc of $O_2$ and 490 cc of $CO_2$ per mil (0.001 inch) of thickness per 100 square inches of area per day at 25° C.

More recently U.S. Pat. No. 4,943,440 to Armstrong issued Jul. 24, 1990 discloses a packaging method and package for packaging cut vegetable salad including a sealed imperforate container having a controlled atmosphere of 0.8–1.5% oxygen and 8–12% carbon dioxide with the balance being nitrogen. However this package is not suitable for packaging cherries because the oxygen percentage is too low resulting in anaerobic conditions and the container is made of high barrier plastic film having a gas permeability of about 18 to 22 cc oxygen per 24 hours per ounce of produce. While this sealed imperforate container may be provided with a cover portion of low barrier plastic film having an oxygen permeability in the range of 200 to 500 cc per mil thickness per 100 square inches area per day, there are no apertures provided the film. This results in the extremely low oxygen content modified atmosphere of 0.8–1.5% oxygen which is insufficient for packaging cherries because it results in an anaerobic condition. Thus, in accordance with the present invention it has been found that a residual preservative gas of higher oxygen content containing about 4–14% oxygen and 4–13% carbon dioxide is necessary for satisfactorily packaging cherries to provide a long shelf life.

Another relevant patent is U.S. Pat. No. 4,224,347 to Woodruff issued Sep. 23, 1980 which shows a packaging process and package for extending the shelf life of cut vegetables employing an imperforate container of plastic material which may be low barrier plastic film having a permeability to oxygen of at least about 500 cc per 100 square inches per 24 hours per mil and a permeability to carbon dioxide of at least 1350 cc per 100 square inches per mil. However the modified atmosphere within the package is provided with at least 25% oxygen and about 3% carbon monoxide and a maximum of 20% carbon dioxide. This atmosphere is unsuitable for packaging cherries because it causes decay and degrades their taste due to its high oxygen and high carbon dioxide content. Thus it has been found that for preserving cherries it is necessary to provide the preservative gas within the container with an oxygen content percentage much less than that in air or less than the approximately 21% oxygen content of air. Preferably the preservative gas should have an oxygen content of about 4–14% by volume.

It is old to provide perforations in plastic packages to change the permeability thereof as discussed in the article "Controlling Atmosphere in a Fresh-Fruit Package" by P. Veeraju and M. Karel, Vol. 40, No. 2, published in 1966 in the periodical Modern Packaging. While this article also discusses employing low barrier plastic films for packaging, it does not suggest a residual preservative gas atmosphere within the package containing 4–14% oxygen and 4–13% carbon dioxide as measured approximately one week after sealing in accordance with the packaging method of the present invention. Also there is no indication that air should be partially evacuated from the package and refilled with an injection gas containing a high percentage of carbon dioxide in the range of 30–50% dioxide with the balance nitrogen when one half the air is removed as in the present invention. It has been found that in the package of the present invention most of this initially high percentage of carbon dioxide is quickly absorbed into the cherries to reduce the respiration rate of the cherries. Thus in one embodiment the respiration rate of the cherries after packaging reduced to about 25% of its respiration rate immediately prior to packaging. This rapid reduction in respiration rate of cherries due to the absorption of carbon dioxide into the fruit greatly increases shelf life and is not recognized in the prior art including the article by Veeraju and Karel.

U.S. Pat. No. 4,548,852 to Mitchell issued Oct. 22, 1985 and U.S. Pat. No. 4,548,824 to Mitchell et al. issued Oct. 22, 1985 both show that it is old to provide a package of meat or vegetable products for home freezing by providing a rigid plastic tray with a flexible plastic cover which collapses in order to provide the maximum expulsion of air from the package prior to freezing. The package is provided with a replaceable seal covering a hole in the package cover to accomplish this evacuation. However they do not disclose a package for preserving cherries provided by a container having at least a portion thereof made of low barrier plastic film containing a residual preservative gas mixture including oxygen at a percent less than air and carbon dioxide at a percentage greater than air in the manner Of the present invention. Instead the oxygen is provided at a higher percentage concentration than that in air, such as 70% $O_2$ for meat, and in this regard is similar to the above-discussed Woodruff '347 patent.

U.S. Pat. No. 3,630,759 to Rumberger issued Dec. 28, 1971 discloses a method of packaging plant foods within an inner plastic pouch and an outer plastic pouch having a gaseous atmosphere therebetween having an oxygen content less than about 15% by volume. However this packaging is more complicated than that of the present invention in that it requires the use of two bags and maintaining a preservative atmosphere between the walls of the two bags which is impractical.

Another patent of interest is U.S. Pat. No. 4,055,931 to Myers issued Nov. 1, 1977 which is directed to a method of providing a controlled atmosphere around a perishable product enclosed within a flexible bag by evacuating the bag and then injecting a controlled atmosphere into the bag for preserving agricultural products such as strawberries and tomatoes. The final atmosphere within the bag does not contain oxygen but apparently consists entirely of carbon dioxide and nitrogen which is unsuitable for the preservation of cherries since it produces anaerobic conditions. Also this has a disadvantage of requiring an air-tight flexible bag which, of course, means that the bag must be made of high barrier plastic material.

SUMMARY OF THE INVENTION

It is therefore one object of the present invention to provide an improved package and packaging method for preserving cherries in a sealed container including at least a portion of a low barrier plastic film and containing a preservative gas including oxygen at a percentage less than that in air and carbon dioxide at a percentage greater than that in air.

Another object of the invention is to provide such an improved package and method of packaging cherries within a protective gas atmosphere initially containing a high percentage of carbon dioxide greater than about 15% $CO_2$ for rapid absorption into the cherries in order to reduce the respiration rate of the cherries and to prevent mold and decay.

A further object of the present invention is to provide such a package and packaging method with a residual protective gas atmosphere seven days after sealing preferably of about 4–14% oxygen and 4–13% carbon dioxide to avoid anaerobic oxygen levels within the container and to prevent mold and decay.

An additional object of the invention is to provide such a package and packaging method in which approximately one half of the air within the container is evacuated and replaced by injecting an injection gas containing about 30–50% carbon dioxide and the balance nitrogen which quickly reduces the respiration rate of the cherries.

Still another object of the invention is to provide an improved package and packaging method for increasing the shelf life of cherries by packaging the cherries in a container containing at least a portion of low barrier film having a permeability of at least 80 cc of $O_2$ and 490 cc of $CO_2$ per mil (0.001 inch) of thickness per 100 square inches of area per day at 25° C. temperature and 760 mm Hg pressure.

A still additional object of the invention is to provide such an improved package and method of packaging in which the low barrier film is of polyethylene having a permeability of at least 400 cc $O_2$ and 1164 cc $CO_2$ per mil (0.001 inch) of thickness per 100 square inches per day per 25° C. and 760 mm Hg.

A still further object of the invention is to provide such an improved package and method of packaging in which the container portion of low barrier plastic film is provided with one or more small perforations of sufficient area to maintain the residual preservative gas concentrations of oxygen and carbon dioxide within the preferred ranges.

DESCRIPTION OF THE DRAWINGS

Other objects and advantages will be apparent from the following detailed description of a preferred embodiment thereof and from the attached drawings of which.

DESCRIPTION OF THE PREFERRED EMBODIMENTS

The present invention involves the use of low barrier plastic film for a package containing fresh cherries, such as Bing type sweet cherries, and a packaging method for preserving such cherries to extend their shelf life. Cherries are known to have a high respiration rate at which oxygen is consumed and carbon dioxide is produced, which results in a relatively short shelf life of about 14 days even when they are refrigerated. There have been many unsuccessful attempts to find a satisfactory method of packaging cherries and a suitable package for storing cherries for a long shelf life suitable for use on a commercial basis. These prior attempts have been unsuccessful for a variety of reasons, including the inability to determine a suitable plastic bag of the proper gas permeability to maintain a preservative gas within the bag of the proper gas composition. In this regard see the two articles by Patterson and Kupferman published in the 1989 and 1990 proceedings of the Washington Horticultural Association. The 1990 proceedings article concludes with the statement "In summary, we have not found a method of modifying the atmosphere through gas injections or semipermeable films which provides an improvement in the retention quality of cherries after a 2–3 week period." Others including Q-Tech International of Portland, Oregon have attempted to provide a suitable package for preserving cherries using high barrier plastic film. A similar teaching is disclosed in U.S. Pat. No. 4,515,266 to Myers referred to above. However these attempts have also been unsuccessful for commercial 20 pound packages of cherries. The Myers '266 patent defines a high barrier plastic film as having a gas permeability of less than 1.0 cc of $O_2$, less than 5.0 cc of $CO_2$ and less than 1.0 cc of $N_2$ per mil (0.001 inch) thickness per 100 square inches per 24 hours at 0° C. and 760 mm Hg.

It has been found in the present invention that a satisfactory package for storing fresh cherries over a long useful shelf life of two months or more can be made of a package having at least a portion of low barrier plastic film. Low barrier plastic film is one having a gas permeability of more than 80 cc $O_2$ and 490 cc of $CO_2$ per mil (0.001 inch) thicknesses per 100 square inches per 24 hours at 25° C. and 760 mm Hg. One suitable type of low barrier plastic film is made from polyethylene including either high density polyethylene or low density polyethylene, but other plastics having similar characteristics, such as polypropylene, may also be used. Thus polypropylene has a permeability of about 80 cc $O_2$ and 490 cc $CO_2$ per mil per 100 square inches per 24 hours at 25° C. and 760 mm Hg.

Figure 1A:
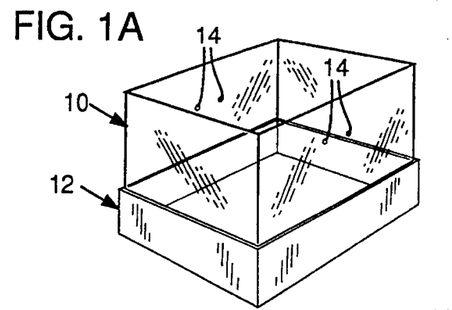
FIG. 1A is an oblique plan view of the cherry package of the present invention with a transparent plastic bag, before the plastic bag is sealed.
Figure 1B:
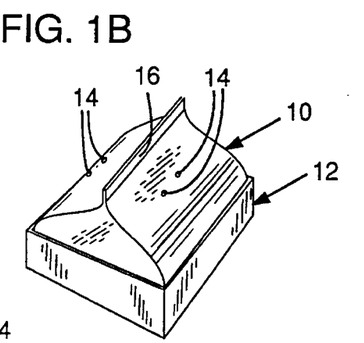
FIGS. 1B and 1C are elevation views of the side and end of package of FIG. 1A after the plastic bag is sealed.
Figure 1C:
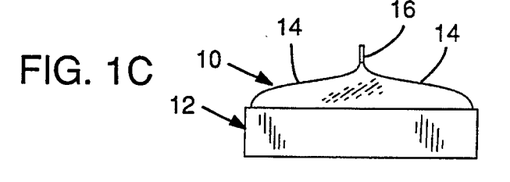

As shown in FIGS. 1A, 1B and 1C a suitable package for cherries includes a plastic bag 10 of low barrier plastic film which may be opaque or transparent polyethylene having a thickness of about 0.5 to 3.0 mil (0.0005 to 0.003 inch) containing cherries in a suitable commercial amount such as 20 pounds. The plastic bag 10 is supported within an open top rectangular cardboard box 12 within which the bag is secured by adding a box top after the packaging method is complete. Preferably the opposite sides of the plastic bag are provided with one or more small perforations 14 of a suitable area size before packaging. These perforations are within a range of about 0.5 to 5.0 millimeter in diameter, to allow the passage of additional oxygen and carbon dioxide through such perforations in order to maintain the composition of a residual preservative gas atmosphere within the bag during storage so that the $O_2$ and $CO_2$ content of such gas is kept within a defined range to prevent decay and mold on the cherries in a manner hereafter described. The number of perforations 14 and their size varies depending upon the amount of cherries in the package and the material employed for the low barrier plastic film of bag 10. However for a 20 pound package of cherries using a low barrier polyethylene bag of low density polyethylene having a permeability of 780 cc $O_2$ and 2860 cc $CO_2$ per mil per 100 square inches per day per 25° C. and 760 mm Hg with a thickness of 2.0 mil (0.002 inch), four 1.0 millimeter diameter perforations are provided.

After the plastic bag 10 has been partially evacuated to remove about one half the air therefrom, an injection gas of at least 30% carbon dioxide and the balance nitrogen is injected into the bag to provide a residual protective gas of the proper composition for the cherries in a manner hereafter described. The top of the bag is sealed along a rectangular seal line 16 adjacent the top of the bag hermetically sealing the bag to maintain the protective gas in such bag and to prevent the entry of air through such seal. However it should be noted that a controlled amount of air does pass into the bag through the perforations 14 and through the wall of the bag due to its gas permeability. After the bag is sealed as shown in FIGS. 1B and 1C, the top of the bag is folded down into the box 12 and a box lid of cardboard (not shown) is placed over the bag onto the cardboard box 12 and secured by adhesive tape or other suitable fastening means for storage.

It has been found that the residual protective gas left within the package after seven days from its sealing, is extremely important in preserving the cherries for a long useful lifetime. The composition of this protective gas is determined by the initial gas composition within the bag at the time of sealing as well as the permeability of the bag to gas and the respiration rate of the cherries which is affected by the storage temperature of the bag. To provide the protective gas a significant portion of the air within the bag is evacuated such as about 50% and then an injection gas of carbon dioxide and nitrogen injected into the bag such as an injection gas of about 30–50% carbon dioxide and the balance nitrogen. This produces a residual protective gas seven days after sealing having a composition of 4–14% oxygen, 4–13% carbon dioxide and the balance nitrogen, which provides improved results in the form of longer shelf time and better quality taste and appearance of the cherries. These improved results are believed to be due in part to the fact that most of the carbon dioxide in the injection gas initially injected into the bag is immediately absorbed in the fruit of the cherry thereby greatly reducing its respiration rate in a short time to a value which is about 25% of its respiration rate just prior to the time the bag was sealed. This much slower respiration rate in a sense causes the cherries to go into hibernation and reduces decay.

By keeping the carbon dioxide content of the residual protective gas within a selected range preferably from 4–13% carbon dioxide, decay and mold are prevented on the cherries without adversely effecting the flavor and appearance of the cherries which increases their longer storage life. In addition, the oxygen level of the residual protective gas within the bag is maintained at a suitable range from 4–14% oxygen to prevent the cherries from going into an oxygen starved anaerobic condition which causes them to decay thereby adversely effecting the flavor and appearance of the fruit.

Figure 3:
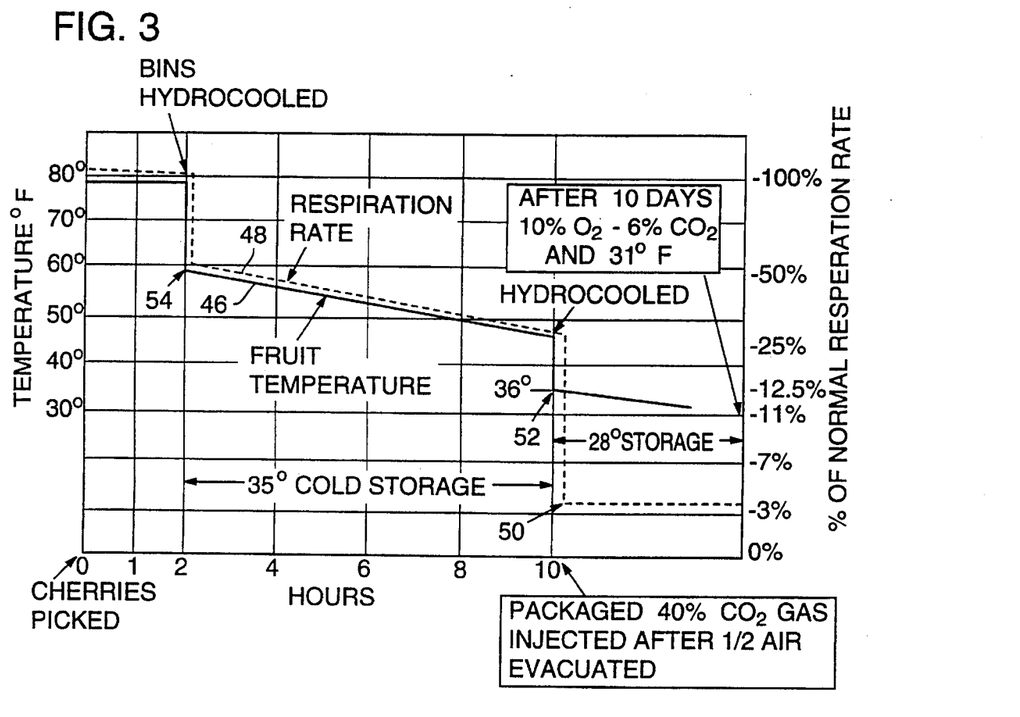
FIG. 3 is a graph showing the relationship of the temperature and respiration rate of cherries packaged in accordance with the present invention.

Before packaging the cherries are hydro-cooled and soaked in water in a manner hereafter described and then placed in cold storage at a temperature of 35° F. for several hours in order to lower the temperature of the cherries to below 50° F. In some cases it may be desirable to provide a water absorbent pad in the bottom of the bag prior to depositing cherries therein in order to provide sufficient humidity within the bag after sealing. Immediately prior to packaging the cherries are further cooled by a second hydro-cooling and after packaging are placed in cold storage at a temperature of about 28° F. which causes the packaged cherries to be cooled to approximately 31° F. after approximately ten days. The respiration rate of the cherries is greatly reduced during cooling. However after partial evacuation when the carbon dioxide is injected into the package of cherries immediately before sealing an even greater reduction in respiration rate is achieved for the cherries as shown in FIG. 3. Thus such $CO_2$ gas injection reduces the respiration rate of the cherries to approximately 25% of the respiration rate immediately prior to packaging. This dramatic reduction in respiration rate is believed to be due to the absorption of carbon dioxide into the cherry fruit which occurs rapidly immediately after the package is sealed.

Figure 2:
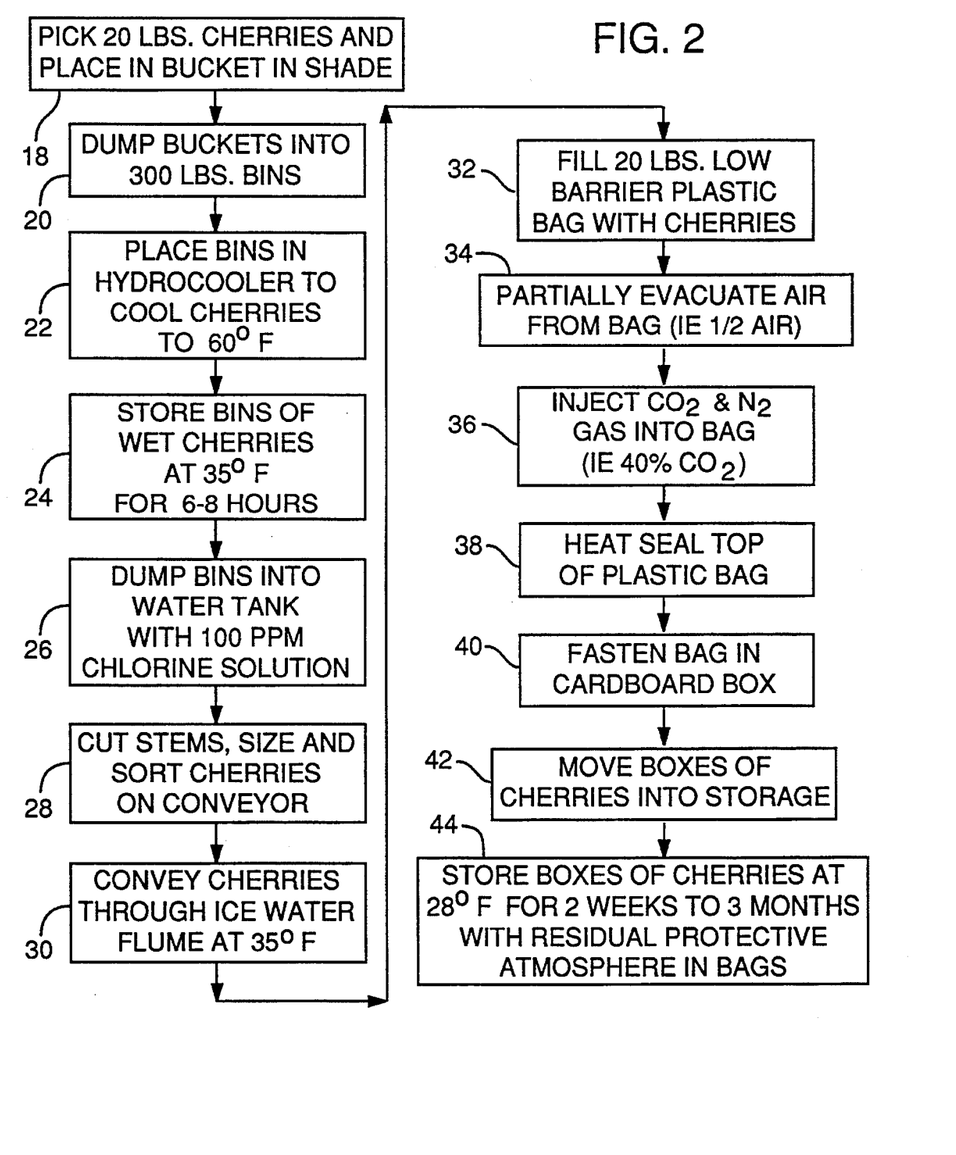
FIG. 2 is a flow diagram of the method steps in the packaging method of the present invention.

A preferred embodiment of the cherry packaging method of the present invention is shown in the method steps flow diagram of FIG. 2. In the first method step 18 the cherries are picked from the tree and placed in a suitable carrying container such as a 20 pound bucket which is put in the shade of the cherry tree for up to one hour to await dumping. In second step 20 the buckets are dumped into bins which may hold up to 300 pounds of cherries per bin. In third step 22 the bins are placed in a hydrocooler to cool the cherries for 1 to 2 hours until they reach a temperature of approximately 60° F. assuming that the cherries initially were at a temperature of approximately 80° F. In a fourth step 24 the bins of wet cherries are stored in cold storage at a temperature of about 35° F. for about six to eight hours in order to cool the cherries from 60° F. to about 48° F. In step 26 the cherries in the bins are dumped into a water tank containing a chlorine solution of approximately 100 parts per million of chlorine for washing and in order to kill any bacteria. In step 28 the cleaned, wet cherries are then fed on a conveyor belt to remove the leaves and then through a stem cutter, a size selector and quality sorter into selected quantities of cherries which are then conveyed through an ice water flume in a second hydro-cooling step 30 at a temperature slightly above freezing on the order of about 33° F. to cool the cherries from a temperature of about 48° F. to a temperature of about 36° F. At this time the cooled cherries are in bagging step 32 deposited into a plastic bag which may be designed to hold 20 pounds of cherries and is made of a low barrier plastic film. In an evacuation step 34 the plastic bag is partially evacuated by two extendable snorkel tubes to remove a portion of the air from the bag and may preferably evacuate approximately one-half the volume of air from the bag. Then an injection gas of carbon dioxide and nitrogen is injected into the bag by the same snorkel during injection step 36. The injection gas has a content of carbon dioxide of at least 30% and may be in the range of 30–50% $CO_2$ with the balance nitrogen. A commercially available gas ejection machine such as an A-300 type evacuation and gas injection machine sold by CVP Systems, Inc. of Downers Grove, Ill. shown in U.S. Pat. Nos. 3,939,624, 3,968,629 and 4,241,588 may be employed. This machine also employs a pair of spaced heat sealing bars which are moved together to seal the top of the bag the after gas injection step 38 and withdrawal of the snorkel.

The sealed bag is secured within the cardboard box by means of applying a box lid which may be fastened to the box by adhesive tape in step 40. The secured boxes of cherries are then moved into storage in step 42 after they are placed on the pallets. The pallets of cherry boxes are stored during step 44 in a refrigerated storage facility such as a warehouse at approximately 28° F. until they are ready to be shipped to customers. The cold storage step 44 reduces the temperature of the packaged cherries from about 36° F. to about 31° F. after approximately 10 days of cold storage. The packaged cherries are maintained in this condition for a storage time period until they are shipped to customers which may be two to four months.

The high respiration rate of sweet cherries causes them to start losing shelf life immediately after being picked, the loss being determined by time and temperature. Careful picking methods, use of padded buckets, dumping the buckets carefully into the 300 lb. bins, avoiding picking in hot afternoons, and hourly pick up of picked fruit help retain shelf life. Bins are quickly collected at the loading area, stacked in the shade, and soon hauled to the warehouse to be put through the bin hydro-cooler and drenched with 33°–37° F. water containing 100 ppm chlorine. The stacks of bins are stored for six to eight hours at 32°–35° F. temperature with good air circulation from blowers, and after a few hours taken to the packing line for dumping into an ice water tank before proceeding to leaf removal, stem separation, sizing and sorting before going slowly through the final hydrocooler in water of about 33° F. and 100 ppm chlorine. Then, in accordance with the invention, the cherries, having a pulp temperature of about 36° F., are loaded into a 20 pound cherry box with a 2 mil liner of low barrier plastic having an absorbent pad in the bottom to maintain high humidity. The 2.0 mil plastic film may be a transparent low density polyethylene having an $O_2$ porosity of 780 cc, $CO_2$ porosity of 2860 cc, and MVTR of 0.92 gm per mil per 100 square inches per 24 hours at 25° C. and 760 mm Hg. After test weighing, the package is transferred down the rollers to an evacuation and gas injection machine such as the A-300 made by CVP Systems. The plastic liner bag top is placed around the snorkels and between the sealing bars. The operator then presses the starting buttons after which the machine applies a vacuum into the package so as not to excessively squeeze the fruit, removing about half of the air from the plastic bag. The machine then injects a measured gas mix in the range of 30–50% $CO_2$, and preferably containing 40% $CO_2$, with the balance $N_2$ into the bag sufficient to fill it to the top. The bag top is then heat sealed between the bars, and after a moment of cooling, released to proceed down the line to have the box top added and the flaps sealed down with tape. The boxes are then placed on a pallet in an arrangement so that large ventilation holes exist from top to bottom of the stack of boxes inside the pallet. After being stretch wrapped for stability, the pallets are placed in 26° F. storage if they are to be shipped within about 24 hours, and, in order to avoid stem damage, in 28° F. storage if they are to be held for several days.

It should be noted that a double-cycle of vacuum and gas injection steps may be employed for method steps 34 and 36 in which case the injection gas has a lower carbon dioxide content of for example 20% $CO_2$, 5% $O_2$ and 75% $N_2$ because the injection gas is injected twice with one injection after each of two evacuation steps.

The relationship between temperature of the cherries and respiration rate of such cherries is shown in the chart of FIG. 3 which includes a temperature curve 46 and a respiration rate curve 48 plotted against time. The respiration rate curve plotted as a percent of normal respiration rate of cherries at 80° F., closely follows the temperature curve until time mark 50 immediately after packaging at which time the respiration rate drops dramatically from about 30% to about 3.0% as a result of injection of the carbon dioxide injection gas into the package and absorption of such carbon dioxide by the cherries as discussed above. Thus, during the second hydrocooling step 30 the temperature curve 46 drops to 36° F. at the ten hour time mark 52 from a temperature of about 48° F. at the end of cold storage step 30. However during packaging the respiration rate curve 48 drops to about 25% of its normal respiration rate of 12.5% at 36° F. or to about 4% of its respiration rate. This additional drop in respiration rate from 12.5% to 4% is apparently due to the absorption of carbon dioxide into the fruit and is believed to be an important factor in the increased shelf life of the packaged cherries which have been packaged in accordance with the present invention.

It should be noted that the first hydro-cooling step 22 in the method of FIG. 2 drops the temperature curve 46 from a high temperature of about 78°–80° F. to a lower temperature of 60° F. at the two hour time mark 54. This results in a reduction in the respiration rate of the cherries to about 50% of the normal respiration rate at 80° F. A further cooling of the cherries in cold storage for six to eight hours during step 24 at a cold storage temperature of 35° F. reduces the temperature of the cherries from 60° F. to about 48° F. at the ten hour time mark 52. This further reduces the respiration rate of the cherries to a level of approximately 25–30% of the normal respiration rate at a temperature of 48° F. Finally, during the second hydro-cooling step 30 immediately prior to packaging the temperature drops from 48° F. to 36° F. at time mark 52. This causes a further drop in the respiration rate of the cherries to a level of approximately 12.5% of the normal respiration rate at 80° F. However the respiration rate continues to fall lower beyond the 12.5% level caused by the decrease in temperature apparently as a result of the absorbed carbon dioxide in the fruit during the injection step 36. Thus the respiration rate of the cherries continues to fall until at time mark 50 it reaches a level of approximately 3–4% of the normal respiration rate where it remains during the cold storage step 44 of FIG. 2. This greatly reduced respiration rate means that less oxygen is consumed by the cherries and less carbon dioxide produced by such cherries during the storage time which may be for a maximum of four months. As a result, the residual protective gas within the sealed bag surrounding the cherries is maintained at its desired composition with an oxygen content in a range of about 4–14% $O_2$ and a carbon dioxide content in a range of about 4–13% $CO_2$.

The first influence on respiration rate of sweet cherries is temperature, which when they are picked from the tree, in the morning about 40°–50° F., and by noon on a hot sunny day 70°–80° F. The respiration rate at 80° F. is about four times that at 45° F., which emphasizes the need for speed in moving the picked fruit to the bin hydro-cooler at the warehouse, for the fruit hydro-cooling step 22 which can reduce temperature by around 20° F. Respiration is the process of using up oxygen and producing carbon dioxide and thus it uses up the energy resources of the fruit and reduces its shelf life, meanwhile producing heat.

After further reduction in pulp temperature of cherries in step 24 during storage and final hydro-cooling step 30, the cherries enter the plastic package in step 32 at about 36° F. The respiration rate now is only about one eighth of the rate when picked at 80° F. Further reduction of the respiration rate requires regulating the oxygen concentration and the carbon dioxide level of the protective gas within the package. Raising the $CO_2$ level and reducing the $O_2$ level has been found to reduce respiration of fruits, including cherries. If the oxygen level is reduced below about 4% $O_2$ the basic amount required by cherries for respiration into the anaerobic zone, then spoilage and death of cells may result. Also, a carbon dioxide atmosphere of 15% or more along with low oxygen often produce poor quality in fruits. The low barrier plastic bags used have a porosity to passage of $CO_2$ molecules over two times greater than $O_2$. This allows enough carbon dioxide to escape from the package to prevent excessive levels around the cherries. The modified packaging system of the invention described here avoids too low oxygen by combining small breather holes 14 in the plastic bag along with low barrier plastic with oxygen porosity sufficient to supply the needs of the cherries. The partial evacuation of about one half the air from the bag and injection of an injection gas of about 30–43% $CO_2$, with the balance $N_2$, dilutes the oxygen supply and the $CO_2$ is mostly absorbed into the fruit is a key element in reducing the respiration rate. The $CO_2$ not only smothers and reduces respiration but is vital in inhibiting mold and decay.

EXAMPLES

The following are examples of packages in accordance with the invention which preserved cherries for a long shelf life of about two months or more.

Example 1

Low barrier film bags of high density polyethylene having a thickness of 0.6 mil (0.0006 inch) manufactured by Shields Bag Co. of Yakima, Wash. were used to package cherries in 20 pound containers. This low barrier film of high density polyethylene had a reported permeability of about 400 cc $O_2$, 1164 cc $CO_2$ per mil (0.001 inch) per 100 square inches per 24 hours at 25° C. and 760 mm Hg. The bags were perforated with one to four holes of 1 millimeter diameter. A double cycle of a one half evacuation in evacuation step and a gas injection filling step for each cycle, using an injection gas of 20% $CO_2$, 5% $O_2$ and 75% $N_2$, was used to fill the bags with protective gas. The bags of cherries were stored at 30° F. and had good appearance and flavor 62 days after packaging.

Example 2

Used 20 pound bags of low barrier, high density polyethylene having a thickness of 0.6 mil per Example 1. However, a single cycle of evacuation and gas injection was used with approximately one half of air being evacuated from bag and an injection gas of 30% $CO_2$ and 70% nitrogen being injected into the bag. The bags had four 1 mm holes and were stored at 30° F. The protective gas in the bag was measured after sealing to have the following percentage composition, with the balance being nitrogen:

| Day 1 | 52 min. | 5 hrs. 20 min. | 8 hrs. 50 min. | 16 hrs. 45 min. |
|---|---|---|---|---|
| $O_2$ | 13.3% | 9.9% | 8.9% | 7.7% |
| $CO_2$ | 4.6% | 6.2% | 7.0% | 7.8% |
| | Day 2 | Day 3 | Day 5 | Day 12 | Day 20 |
| $O_2$ | 7.3% | 10.8% | 12.3% | 12.0% | 11.5% |
| $CO_2$ | 7.5% | 5.9% | 5.9% | 4.5% | 5.0% |

Example 3

Used four 20 pound bags and same packaging method as Example 2 but had three 1 mm holes in bag. The residual protective gas within the bag as an average of four bags had the following composition the day of measurement:

| | Day 7 | Day 15 | Day 22 |
|---|---|---|---|
| $O_2$ | 9.8% | 11.9% | 11.9% |
| $CO_2$ | 5.8% | 4.9% | 4.6% |

Example 4

Used two 20 pound bags and sample package method as Example 2 but had two 1 mm holes in bag. The residual protective gas within the bag as an average of two bags, had the following composition on the day of measurement:

| | Day 7 | Day 13 | Day 21 |
|---|---|---|---|
| $O_2$ | 8.7% | 9.5% | 10.9% |
| $CO_2$ | 7.3% | 5.7% | 5.1% |

Example 5

Used five 20 pound bags and same package method as Example 2 but had three 1 mm holes and an injection gas of 43% $CO_2$, 57%$N_2$. The residual protective gas within the bag as an average of five bags, had the following composition on the day of measurement.

|  | Day 7 | Day 14 | Day 22 |
|---|---|---|---|
| $O_2$ | 14.2% | 14.3% | 13.1% |
| $CO_2$ | 4.3% | 4.2% | 4.2% |

When compared with Example 3 which had the same conditions except for an injection gas of 30% $CO_2$, 70% $N_2$, Example 5 had a higher oxygen content and low carbon dioxide content at day 7. This indicates that the respiration rate of the in Example 5 were reduced to a lower rate by the higher percent (43% $CO_2$ vs. 30% $CO_2$) of carbon dioxide in the injection gas. Also the stem and fruit condition of the cherries of Example 5 outlasted that of Example 3, and was good 132 days after packaging and had very little sign of decay or mold.

Example 6

Use two 20 pound bags of white low barrier, low density polyethylene of 1.5 mil (0.0015 inch) thickness with four 1 mm holes were used with the same packaging method of Example 2. The gas permeability of this film was reported to be 675 cc $O_2$ and 2700 cc $CO_2$ per mil thickness per 100 square inches per 24 hours at standard atmosphere temperature (25° C.) and pressure (760 mm Hg). These bags were also manufactured by Shields Bag Co. of Yakima, Wash. The residual protective gas within the bag as an average of two bags, had the following composition on the day of measurement.

|  | Day 7 | Day 14 | Day 22 |
|---|---|---|---|
| $O_2$ | 11.5% | 12.0% | 12.5% |
| $CO_2$ | 9.6% | 8.0% | 7.9% |

Example 7

Use 20 pound bags of clear low barrier film of low density polyethylene of 2.0 mil (0.002 inch) thickness with four 1 mm holes and a water absorbent pad of paper in the bottom of the bag to maintain high humidity after the wet cherries are placed in the bag. The gas permeability of this film is reported to be 780 cc $O_2$ and 2860 cc $CO_2$ per mil per 100 square inches per 24 hours at 25° C. and 760 mm Hg. The moisture vapor transmission rate (MVTR) of this film is 0.92 gm per mil per 100 square inches per 24 hours at 25° C. and 760 mm Hg. This is about the same MVTR as the 0.6 mil low barrier, high density polyethylene bag. The bag is evacuated to remove about one half the air and an injection gas of 40% $CO_2$ and 60% $N_2$ is injected into the bag to fill it. The bags of cherries are stored at 26° F. if they are shipped within 24 hours of packaging, or at 28° F. storage temperature if stored longer. If a shipment temperature of 32° F. or less is used, the cherries will arrive in excellent condition with green stems, bright fruit and acceptable flavor even after two months from packaging.

It will be obvious to those having ordinary skill in the art that many changes may be made in the preferred embodiments described above without departing from the heart of the invention. Therefore the scope of the present invention should be determined by the following claims.

I claim:

1. A method of controlled atmosphere packaging for preserving cherries during shipment, comprising the steps of:

providing a container including at least a portion of low barrier plastic film on several sides of the container having a gas permeability of between about 80 cc and 780 cc of $O_2$ and between about 490 cc and 2860 cc of $CO_2$ per 0.001 inch of thickness per 100 square inches of area per day at 25° C. temperature and 760 mm Hg pressure;

cooling cherries to a temperature below 40° F. to reduce their respiration rate;

filling said shipping container with a quantity of said cooled cherries which are provided with moisture on their outer surface;

evacuating at least a portion of the air from said container;

refilling the partially evacuated container with an injection gas mixture including carbon dioxide and nitrogen to provide a preservative gas within said container which is a gas mixture including oxygen at a percentage less than that in air and carbon dioxide at a percentage greater than that in air;

said cooled cherries within said container being wet with moisture on their outer surface so that carbon dioxide is rapidly absorbed by the cooled moist cherries to further reduce the respiration rate of the cooled moist cherries within said container to less than 50% of their normal respiration rate at the temperature to which said cherries are cooled;

sealing the injection gas filled container, said low barrier film's gas permeability maintaining a controlled atmosphere in said container of sufficient oxygen and carbon dioxide to preserve the cherries during storage for at least 30 days; and refrigerated storage of the sealed container.

2. A method in accordance with claim 1 in which the low barrier plastic film is provided with at least one perforation to allow the cherries to breath.

3. A method in accordance with claim 1 in which the plastic film is high density polyethylene plastic having a permeability of at least 400 cc of $O_2$ and 1164 cc of $CO_2$ per 0.001 inch of thickness per 100 square inches of area per day at 25° C. and 760 mm Hg.

4. A method in accordance with claim 1 in which the plastic film is low density polyethylene plastic having a permeability of at least 600 cc of $O_2$ and 2700 cc of $CO_2$ per 0.001 inch of thickness per 100 square inches of area per day at 25° C. and 760 mm Hg.

5. A method in accordance with claim 1 in which the cherries are cooled in water before they are placed in the container and a water absorbent pad is placed within the container before it is sealed to maintain humidity within the container after sealing.

6. A method in accordance with claim 1 in which the sealed container is cooled further and maintained at a storage temperature less than 34° F.

7. A method in accordance with claim 1 in which the container is provided with a filling of residual preservative gas which contains approximately 4–14% $O_2$ and approximately 4–13% $CO_2$, after about one week from the sealing of the container.

8. A method in accordance with claim 7 in which the container is a flexible plastic bag containing about 20 pounds of cherries which is provided with a plurality of perforations of sufficient area to maintain said residual preservative gas in said container.

9. A method in accordance with claim 8 in which the bag is of a plastic film having a thickness in the range of 0.0006 inch to 0.0030 inch and the perforations are less than 2.0 mm in diameter.

10. A method in accordance with claim 9 in which the perforations are formed in the bag before the cherries are placed in the bag.

11. A method in accordance with claim 1 in which the evacuating step removes about 50% of the air in the container, and the refilling step injects into the partially evacuated container a gas mixture of at least 30% $CO_2$ and the balance nitrogen.

12. A method of controlled atmosphere packaging for preserving cherries during shipment, comprising the steps of:

providing a container including at least a major container portion of low barrier plastic film having a gas permeability of at least about 80 cc of $O_2$ and at least about 490 cc of $CO_2$ per 0.001 inch of thickness per 100 square inches of area per day at 25° C. temperature and 760 mm Hg pressure;

cooling cherries to a temperature below 40° F. to reduce their respiration rate;

filling said shipping container with a quantity of said cooled cherries at least some of which have moisture thereon;

evacuating at least a portion of the air from said container;

refilling the partially evacuated container with an injection gas mixture including carbon dioxide and nitrogen to provide a preservative gas within said container which is a gas mixture including oxygen at a percentage less than that in air and carbon dioxide at a percentage greater than that in air;

said cooled cherries within said container being wet with moisture on their outer surface so that carbon dioxide is rapidly absorbed by the cooled moist cherries to further reduce the respiration of the cooled, moist cherries within said container to less than 50% of their normal respiration rate at the temperature to which the cherries are cooled;

sealing the injection gas filled container; and refrigerated storage of the sealed container.

13. A method in accordance with claim 12 in which the low barrier plastic film is provided with at least one perforation to allow the cherries to breath.

14. A method in accordance with claim 12 in which the plastic film is high density polyethylene plastic having a permeability of at least 400 cc of $O_2$ and 1164 cc of $CO_2$ per 0.001 inch of thickness per 100 square inches of area per day at 25° C. and 760 mm Hg.

15. A method in accordance with claim 12 in which the plastic film is low density polyethylene plastic having a permeability of at least 600 cc of $O_2$ and 2700 cc of $CO_2$ per 0.001 inch of thickness per 100 square inches of area per day at 25° C. and 760 mm Hg.

16. A method in accordance with claim 15 in which the container is a flexible plastic bag containing about 20 pounds of cherries which is provided with a plurality of perforations of sufficient area to maintain said residual preservative gas in said container.

17. A method in accordance with claim 16 in which the bag is of a plastic film having a thickness in the range of 0.0006 inch to 0.0030 inch and the perforations are less than 2.0 mm in diameter.

18. A method in accordance with claim 12 in which the container is provided with a filling of residual preservative gas which contains approximately 4–14% $O_2$ and approximately 4–13% $CO_2$ after about one week from the sealing of the container.

19. A method in accordance with claim 12 in which the evacuating step removes about 50% of the air in the container, and the refilling step injects into the partially evacuated container a gas mixture of at least 30% $CO_2$ and the balance nitrogen.

20. A method of controlled atmosphere packaging for preserving cherries during shipment, comprising the steps of:

providing a commercial shipping size container including at least a major container portion of low barrier plastic film having a gas permeability of at least about 80 cc of $O_2$ and at least about 490 cc of $CO_2$ per 0.001 inch of thickness per 100 square inches of area per day at 25° C. temperature and 760 mm Hg pressure, said $CO_2$ permeability being at least twice that of said $O_2$ permeability;

cooling cherries to a temperature below 40° F. to reduce their respiration rate;

filling said shipping container with a commercial quantity of said cooled cherries at least some of which have moisture thereon;

evacuating at least a portion of the air from said container;

refilling the partially evacuated container with an injection gas mixture including carbon dioxide and nitrogen to provide a preservative gas within said container which is a gas mixture including oxygen at a percentage less than that in air and carbon dioxide at a percentage greater than that in air;

said cooled cherries within said container being wet with moisture on their outer surface so that carbon dioxide is rapidly absorbed by the the cooled moist cherries to further reduce the respiration rate of the cooled, moist cherries within said container to less than 50% of their normal respiration rate at the temperature to which said cherries are cooled by causing the moist cherries to absorb a portion of the $CO_2$ in the preservative gas;

sealing the injection gas filled container; and refrigerated storage of the sealed container.

* * * * *

UNITED STATES PATENT AND TRADEMARK OFFICE
CERTIFICATE OF CORRECTION

PATENT NO. : 5,565,230

DATED : October 15, 1996

INVENTOR(S) : Donald W. Bailey

It is certified that error appears in the above-indentified patent and that said Letters Patent is hereby corrected as shown below:

In the Abstract:

"760 mm HI." should read --760 mm $H_g$.--.

"months or mere without" should read --months or more without--

Column 2, line 19, "provided the" should read --provided through the--.

Column 2, line 61, "30-50% dioxide" should read --30-50% carbon dioxide--.

Column 3, line 19, "Of" should read --of--.

Column 4, line 12, "barrier film" should read --barrier plastic film--.

Column 6, line 39, "effecting" should read --affecting--.

Column 7, line 6, "hydrocooler" should read --hydro-cooler--.

Column 11, line 18, "the in" should read --the cherries in--.

UNITED STATES PATENT AND TRADEMARK OFFICE
CERTIFICATE OF CORRECTION

PATENT NO. : 5,565,230
DATED : October 15, 1996
INVENTOR(S) : Donald W. Bailey

It is certified that error appears in the above-indentified patent and that said Letters Patent is hereby corrected as shown below:

Column 12, line 42, "breath" should read --breathe--.
Column 13, line 49, "breath" should read --breathe--.

Signed and Sealed this

Seventh Day of October, 1997

*Attest:*

BRUCE LEHMAN

*Attesting Officer*  *Commissioner of Patents and Trademarks*